United States Patent
Teraya

(10) Patent No.: US 8,818,686 B2
(45) Date of Patent: Aug. 26, 2014

(54) CONTROL DEVICE FOR INTERNAL COMBUSTION ENGINE, HYBRID VEHICLE INCLUDING THE SAME, AND METHOD FOR CONTROLLING INTERNAL COMBUSTION ENGINE

(75) Inventor: Ryuta Teraya, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 0 days.

(21) Appl. No.: 13/806,272

(22) PCT Filed: Jun. 24, 2010

(86) PCT No.: PCT/JP2010/060745
§ 371 (c)(1),
(2), (4) Date: Dec. 21, 2012

(87) PCT Pub. No.: WO2011/161793
PCT Pub. Date: Dec. 29, 2011

(65) Prior Publication Data
US 2013/0103243 A1    Apr. 25, 2013

(51) Int. Cl.
*F02D 41/00* (2006.01)
*B60W 20/00* (2006.01)

(52) U.S. Cl.
USPC .......................................... 701/101; 701/104

(58) Field of Classification Search
CPC ............................ F02D 41/0002; B60W 20/00
USPC .................................... 123/520; 701/101, 104
See application file for complete search history.

(56) References Cited

U.S. PATENT DOCUMENTS

| 5,862,795 A * | 1/1999 | Osanai ...................... 123/520 |
| 7,185,641 B2 | 3/2007 | Suzuki |
| 2005/0155587 A1 | 7/2005 | Suzuki |
| 2007/0227515 A1* | 10/2007 | Uchida ...................... 123/520 |

FOREIGN PATENT DOCUMENTS

| EP | 0943791 A2 | 9/1999 |
| JP | 2002-089323 A | 3/2002 |
| JP | 2004-301129 A | 10/2004 |
| JP | 2005-201134 A | 7/2005 |
| JP | 2007-332834 A | 12/2007 |
| JP | 2009097458 A | 5/2009 |
| JP | 2009-191758 A | 8/2009 |
| WO | 99/58836 A1 | 11/1999 |

* cited by examiner

*Primary Examiner* — Fadey Jabr
*Assistant Examiner* — Martin Weeks
(74) *Attorney, Agent, or Firm* — Kenyon & Kenyon LLP

(57) ABSTRACT

A purge control implementation determination unit determines whether or not to implement purge control in accordance with predetermined implementation conditions. If it is determined to implement the purge control, a purge control unit actually implements the purge control. A throttle opening degree upper limit switching unit switches an upper limit value of an opening degree of a throttle based on a determination result of the purge control implementation determination unit. A throttle opening degree control unit controls the opening degree of the throttle so as not to exceed the upper limit value set by the throttle opening degree upper limit switching unit.

5 Claims, 5 Drawing Sheets

| THROTTLE OPENING DEGREE | NEGATIVE PRESSURE | PURGE AMOUNT | PUMPING LOSS |
|---|---|---|---|
| LARGE | LOW | SMALL | SMALL |
| SMALL | HIGH | LARGE | LARGE |

CONTROL DEVICE FOR INTERNAL COMBUSTION ENGINE, HYBRID VEHICLE INCLUDING THE SAME, AND METHOD FOR CONTROLLING INTERNAL COMBUSTION ENGINE

This is a 371 national phase application of PCT/JP2010/060745 filed 24 Jun. 2010, the contents of which are incorporated herein by reference.

TITLE OF INVENTION

Control Device for Internal Combustion Engine, Hybrid Vehicle Including the Same, and Method for Controlling Internal Combustion Engine

TECHNICAL FIELD

The present invention relates to a control device for an internal combustion engine, a hybrid vehicle including the same, and a method for controlling an internal combustion engine. In particular, the present invention relates to a technique for controlling an internal combustion engine capable of implementing purge control which causes evaporated fuel generated within a fuel tank to flow into an intake pipe.

BACKGROUND ART

WO 99/58836 (PTL 1) discloses a method for controlling a throttle valve in a gasoline engine including purge control means supplying evaporated fuel (gasoline vapor) to an intake system. In this control method, a throttle valve opening degree is corrected by changing an opening degree of the throttle valve in a closing direction in accordance with a calculated purge flow amount.

According to this control method, a vehicle speed does not change independently of a driver's intention, and drivability is improved (see PTL 1).

CITATION LIST

Patent Literature

PTL 1: WO 99/58836
PTL 2: Japanese Patent Laying-Open No, 2007-332834
PTL 3: Japanese Patent Laying-Open No, 2005-201134

SUMMARY OF INVENTION

Technical Problem

In purge control which causes evaporated fuel generated within a fuel tank to flow into an intake pipe, the evaporated fuel adsorbed to a canister is caused to flow into the intake pipe, utilizing a negative pressure generated within the intake pipe by limiting an opening degree of a throttle provided in the intake pipe. However, the negative pressure in the intake pipe increases pumping loss, which contributes to deterioration of fuel efficiency.

On the other hand, when the opening degree of the throttle is not limited to reduce pumping loss, it is not possible to secure a negative pressure required to cause the evaporated fuel to flow into the intake pipe, and it is not possible to secure a purge flow amount by the purge control. As a result, evaporative emission is deteriorated.

The present invention has been made to solve the aforementioned problem, and one object of the present invention is to provide a control device for an internal combustion engine capable of preventing deterioration of evaporative emission and also preventing deterioration of fuel efficiency, and a hybrid vehicle including the same.

Another object of the present invention is to provide a method for controlling an internal combustion engine capable of preventing deterioration of evaporative emission and also preventing deterioration of fuel efficiency.

Solution to Problem

According to the present invention, an internal combustion engine includes a purge mechanism for implementing purge control which causes evaporated fuel generated within a fuel tank to flow into an intake pipe, utilizing a negative pressure within the intake pipe which varies in accordance with an opening degree of a throttle provided in the intake pipe. A control device for the internal combustion engine includes a determination unit and a switching unit. The determination unit determines whether or not to implement the purge control in accordance with predetermined implementation conditions. The switching unit switches an upper limit value of the opening degree of the throttle based on a determination result of the determination unit.

Preferably, when it is determined by the determination unit to implement the purge control, the switching unit sets the upper limit value to a first value. On the other hand, when it is determined by the determination unit not to implement the purge control, the switching unit sets the upper limit value to a second value larger than the first value.

More preferably, the first value is a limited opening degree of the throttle which can secure a negative pressure required to cause the evaporated fuel to flow into the intake pipe by the purge mechanism. The second value is a maximum opening degree of the throttle.

More preferably, the control device for the internal combustion engine further includes a throttle opening degree control unit. When it is determined by the determination unit not to implement the purge control, the throttle opening degree control unit controls the opening degree of the throttle to a fuel efficiency-optimizing opening degree for optimizing fuel efficiency of the internal combustion engine.

Further, according, to the present invention, a hybrid vehicle includes any control device for an internal combustion engine described above.

Furthermore, according to the present invention, an internal combustion engine includes a purge mechanism for implementing purge control which causes evaporated fuel generated within a fuel tank to flow into an intake pipe, utilizing a negative pressure within the intake pipe which varies in accordance with an opening degree of a throttle provided in the intake pipe. A method for controlling the internal combustion engine includes the steps of determining whether or not to implement the purge control in accordance with predetermined implementation conditions, and switching an upper limit value of the opening degree of the throttle based on a determination result as to whether or not to implement the purge control.

Preferably, the step of switching the upper limit value includes the steps of setting the upper limit value to a first value when it is determined to implement the purge control, and setting the upper limit value to a second value larger than the first value when it is determined not to implement the purge control.

More preferably, the first value is a limited opening degree of the throttle which can secure a negative pressure required to cause the evaporated fuel to flow into the intake pipe by the purge mechanism. The second value is a maximum opening degree of the throttle.

More preferably, the method for controlling the internal combustion engine further includes the step of controlling the opening degree of the throttle to a fuel efficiency-optimizing opening degree for optimizing fuel efficiency of the internal combustion engine, when it is determined not to implement the purge control.

Advantageous Effects of Invention

In the present invention, the upper limit value of the opening degree of the throttle is switched based on the determination result as to whether or not to implement the purge control. Thereby, for example, if it is determined to implement the purge control, the upper limit value is set to the limited opening degree which can secure the negative pressure required to cause the evaporated fuel to flow into the intake pipe by the purge mechanism, and if it is determined not to implement the purge control, the upper limit value is set to the maximum opening degree. Thus, pumping loss can be reduced without disturbing implementation of the purge control.

Therefore, according to the present invention, deterioration of evaporative emission can be prevented, and deterioration of fuel efficiency can also be prevented.

DESCRIPTION OF EMBODIMENTS

Figure 1:
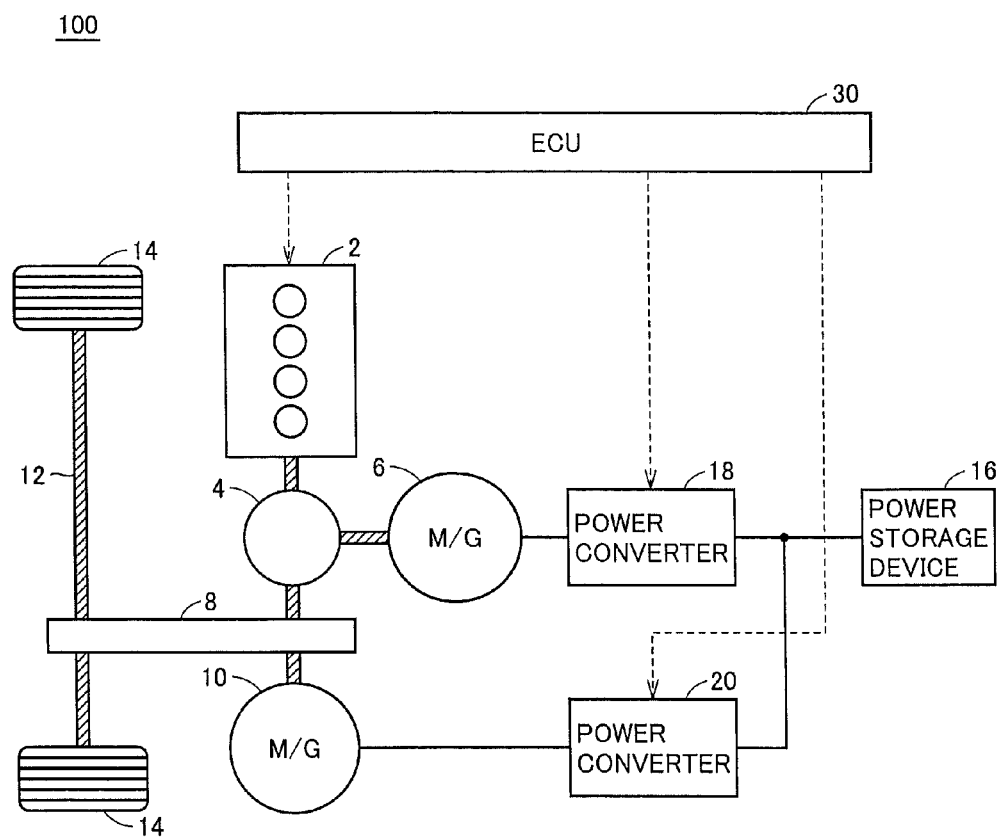
FIG. 1 is an overall block diagram of a hybrid vehicle shown as one example of a vehicle including a control device for an internal combustion engine in accordance with an embodiment of the present invention.

Hereinafter, an embodiment of the present invention will be described in detail with reference to the drawings. It is noted that identical or corresponding parts in the drawings will be designated by the same reference numerals, and the description thereof will not be repeated.

FIG. 1 is an overall block diagram of a hybrid vehicle shown as one example of a vehicle including a control device for an internal combustion engine in accordance with an embodiment of the present invention. Referring to FIG. 1, a hybrid vehicle 100 includes an engine 2, a power split device 4, motor generators 6 and 10, a reduction mechanism 8, a drive shaft 12, and wheels 14. Hybrid vehicle 100 further includes a power storage device 16, power converters 18 and 20, and an ECU (Electronic Control Unit) 30.

Engine 2 converts heat energy generated by combustion of fuel into kinetic energy for kinetic elements such as a piston and a rotor, and outputs the converted kinetic energy to power split device 4. Engine 2 includes a purge mechanism for implementing purge control which causes evaporated fuel generated within a fuel tank to flow into an intake pipe, utilizing a negative pressure within the intake pipe which varies in accordance with an opening degree of a throttle provided in the intake pipe. A detailed configuration of the internal combustion engine including the purge mechanism will be described later.

Power split device 4 is coupled to engine 2, motor generator 6, and reduction mechanism 8 to distribute motive power among them. For example, a planetary gear having three rotation shafts of a sun gear, a planetary carrier, and a ring gear can be used as power split device 4, and these three rotation shafts are connected to rotation shafts of engine 2 and motor generator 6 and an input shaft of reduction mechanism 8, respectively. Further, a rotation shaft of motor generator 10 is coupled to the input shaft of reduction mechanism 8. Namely, motor generator 10 and reduction mechanism 8 have the same rotation shaft, and the rotation shaft is connected to the ring gear of power split device 4.

Then, the kinetic energy generated by engine 2 is distributed by power split device 4 to motor generator 6 and reduction mechanism 8. Namely, engine 2 is mounted on hybrid vehicle 100 as a motive power source for driving drive shaft 12 and also driving motor generator 6. Motor generator 6 is mounted on hybrid vehicle 100 to operate as a generator driven by engine 2 and operate as a motor capable of starting engine 2. Further, motor generator 10 is mounted on hybrid vehicle 100 as a motive power source for driving drive shaft 12.

Power storage device 16 is a rechargeable direct current (DC) power source which stores electric power for traveling the vehicle, and is composed of, for example, a secondary battery such as a nickel hydride battery and a lithium ion battery. Power storage device 16 supplies electric power to power converters 18 and 20. Further, while motor generator 6 and/or 10 is generating electric power, power storage device 16 is charged by receiving electric power from power converter 18 and/or 20. It is noted that a large-capacity capacitor can also be adopted as power storage device 16, and any electric power buffer can be used as long as it can temporarily store electric power generated by motor generators 6 and 10 and supply the stored electric power to motor generators 6 and 10.

Power converter 18 converts the electric power generated by motor generator 6 into DC power, and outputs it to power storage device 16. Power converter 20 converts the DC power supplied from power storage device 16 into alternating current (AC) power, and outputs it to motor generator 10. It is noted that, when engine 2 is started, power converter 18 converts the DC power supplied from power storage device 16 into AC power, and outputs it to motor generator 6. Further, while the vehicle is being braked or its acceleration is being reduced on a downhill slope, power converter 20 converts the electric power generated by motor generator 10 into DC power, and outputs it to power storage device 16. It is noted that each of power converters 18 and 20 is composed of, for example, a three-phase PWM (Pulse Width Modulation) inverter including switching elements for three phases.

Each of motor generators 6 and 10 is an AC motor, and is composed of, for example, a three-phase AC synchronous motor having a permanent magnet embedded in a rotor. Motor generator 6 converts the kinetic energy generated by engine 2 into electrical energy, and outputs it to power converter 18. Further, motor generator 6 generates a drive force using three-phase AC power received from power converter 18 to start engine 2. Motor generator 10 generates a drive torque for the vehicle using three-phase AC power received from power converter 20. Further, while the vehicle is being braked or its acceleration is being reduced on a downhill slope, motor generator 10 converts mechanical energy stored in the vehicle as kinetic energy and potential energy into electrical energy, and outputs it to power converter 20.

ECU 30 generates drive signals for driving engine 2 and motor generators 6 and 10, and outputs the generated drive signals to engine 2 and power converters 18 and 20.

Further, ECU 30 determines whether or not to implement the purge control by the purge mechanism (described later) of engine 2 in accordance with predetermined implementation conditions. Then, ECU 30 switches an upper limit value of the opening degree of the throttle based on its determination result. Specifically, if ECU 30 determines to implement the purge control, ECU 30 sets the upper limit value of the opening degree of the throttle to a limited opening degree which can secure a negative pressure required to cause the evaporated fuel to flow into the intake pipe by the purge mechanism. On the other hand, if ECU 30 determines not to implement the purge control, ECU 30 sets the upper limit value of the opening degree of the throttle to a maximum opening degree (for example, a mechanical maximum opening degree).

Figure 2:
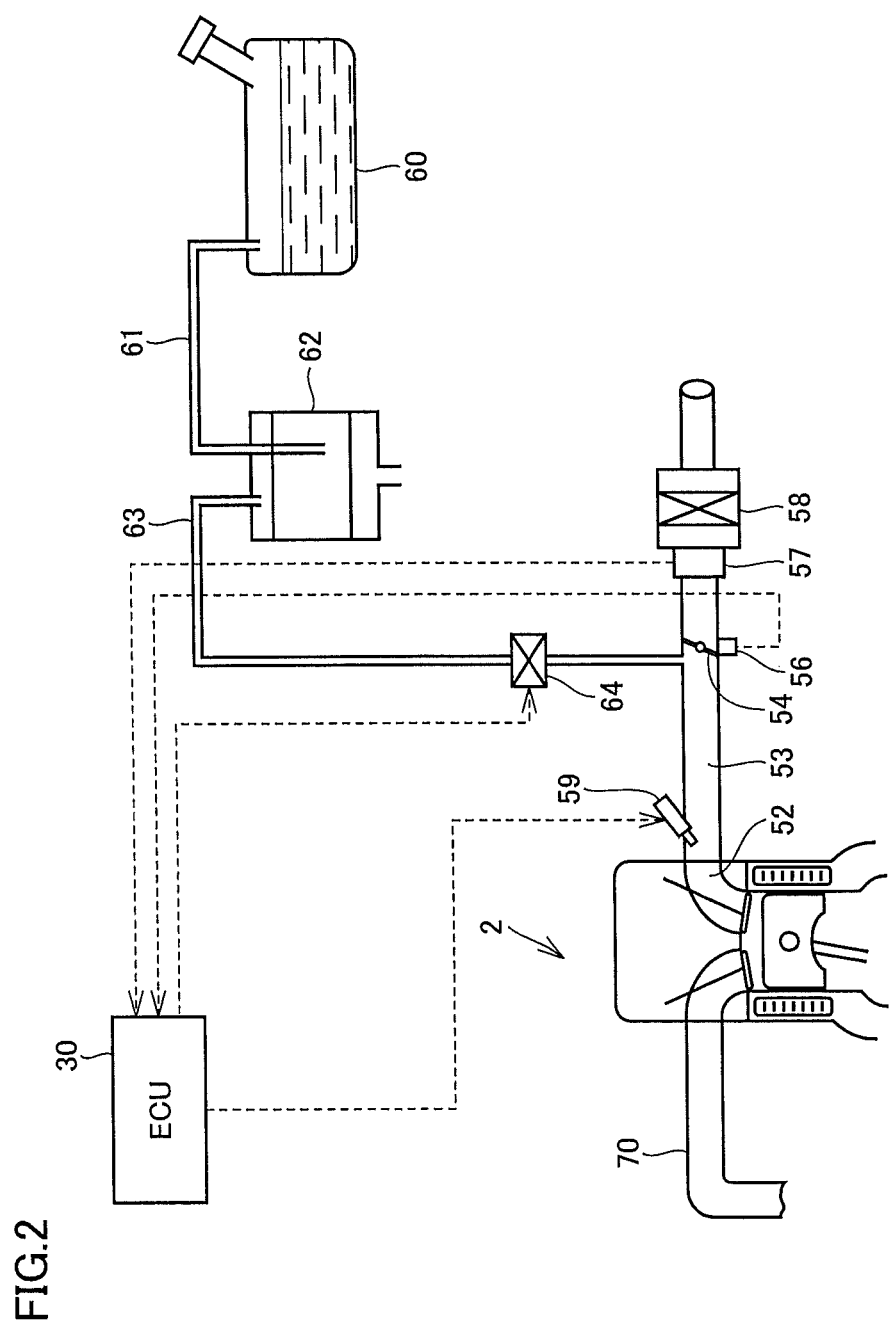
FIG. 2 is a view schematically showing a configuration of an intake system of the engine.

FIG. 2 is a view schematically showing a configuration of an intake system of engine 2. Referring to FIG. 2, the intake system of engine 2 includes an intake port 52, an intake pipe 53, a throttle 54, a throttle opening degree sensor 56, an air flow meter 57, an air cleaner 58, and an injector 59. The intake system further includes a canister 62, a purge flow channel 63, and a purge control valve 64.

Air cleaner 58 is provided at an uppermost stream portion in intake pipe 53. Air flow meter 57 is provided downstream of air cleaner 58. Air flow meter 57 detects an intake air amount and outputs a detected value thereof to ECU 30. Throttle 54 is provided downstream of air flow meter 57, and its opening degree is controlled by ECU 30. Throttle opening degree sensor 56 detects the opening degree of throttle 54 and outputs a detected value thereof to ECU 30.

Injector 59 is provided downstream of throttle 54. Injector 59 communicates with a fuel tank 60 through a fuel pipe and a fuel pump not shown, and injects fuel supplied by the fuel pump to intake port 52.

A release flow channel 61 for releasing evaporated fuel generated within fuel tank 60 extends from an upper portion of fuel tank 60. Release flow channel 61 communicates with canister 62. Canister 62 includes an adsorption portion made of activated carbon or the like, and a new air inlet in communication with the atmosphere is provided at a lower portion of canister 62.

Purge flow channel 63 extends from an upper portion of canister 62, and communicates with intake pipe 53 at a location downstream of throttle 54. Then, an air-fuel mixture of new air from the new air inlet and evaporated fuel stored in the adsorption portion is supplied downstream of throttle 54 in intake pipe 53 through purge flow channel 63. Purge control valve 64 is provided in purge flow channel 63, and its opening degree is controlled by ECU 30.

In the present embodiment, release flow channel 61, canister 62, purge flow channel 63, and purge control valve 64 constitute a purge mechanism for implementing purge control which causes the evaporated fuel generated within fuel tank 60 to flow into intake pipe 53. When purge control valve 64 is in an open state, the purge mechanism causes the evaporated fuel adsorbed by canister 62 to be released into intake pipe 53, utilizing a negative pressure within intake pipe 53 which varies in accordance with the opening degree of throttle 54 provided in intake pipe 53.

Namely, in order to implement the purge control by the purge mechanism, it is necessary to limit the opening degree of throttle 54 and secure a negative pressure required to cause the evaporated fuel to flow into intake pipe 53. However, the negative pressure in the intake pipe increases pumping loss, which contributes to deterioration of fuel efficiency. On the other hand, when the opening degree of throttle 54 is not limited to reduce pumping loss, it is not possible to secure the negative pressure required to cause the evaporated fuel to flow into intake pipe 53, and it is not possible to secure a purge flow amount by the purge control. As a result, evaporative emission is deteriorated.

Figures 3, 4:
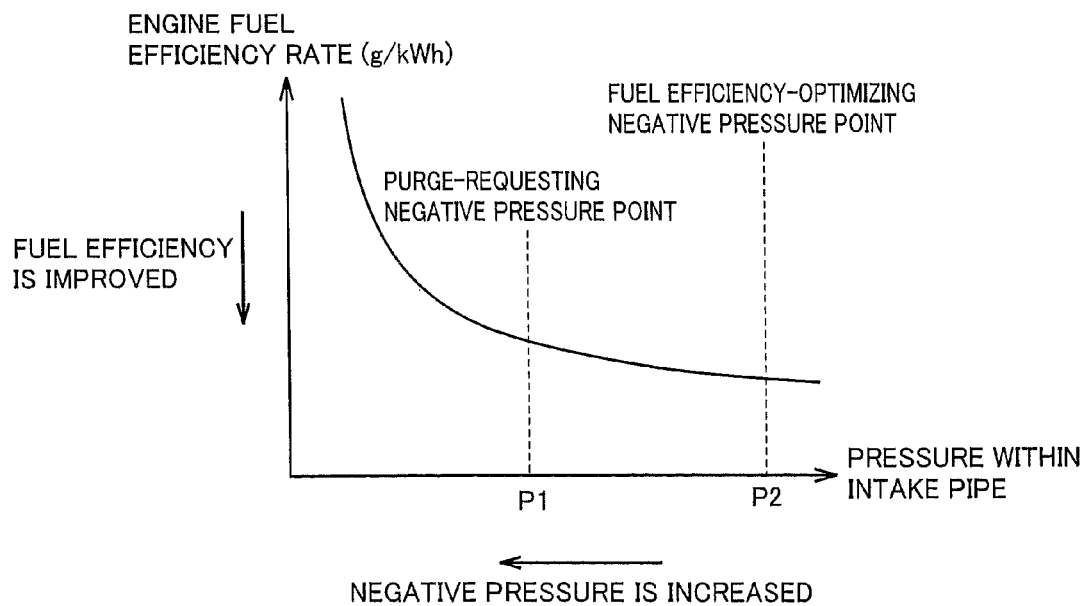
FIG. 3 is a view summarizing the relation between a purge amount and pumping loss.
FIG. 4 is a view showing the relation between a pressure within an intake pipe and an engine fuel efficiency rate.

FIG. 3 is a view summarizing the relation between a purge amount and pumping loss. Referring to FIG. 3, if throttle 54 has a large opening degree, the negative pressure in intake pipe 53 is low (an absolute pressure within intake pipe 53 is relatively high), and thus the pumping loss can be decreased, but the purge amount is small. On the other hand, if throttle 54 has a small opening degree, the negative pressure in intake pipe 53 is high (the absolute pressure within intake pipe 53 is relatively low), and thus the purge amount can be secured, but the pumping loss is increased.

Hence, in the present embodiment, the upper limit value of the opening degree of throttle 54 is switched based on the determination result as to whether or not to implement the purge control. Specifically, whether or not to implement the purge control is determined in accordance with the predetermined implementation conditions. Then, if it is determined to implement the purge control, the upper limit value is set to the limited opening degree which can secure the negative pressure required to cause the evaporated fuel to flow into intake pipe 53 by the purge mechanism, and if it is determined not to implement the purge control, the upper limit value is set to the maximum opening degree (for example, the mechanical maximum opening degree).

This can reduce the pumping loss caused by the opening degree of throttle 54 being limited to the limited opening degree even though the purge control is not implemented.

FIG. 4 is a view showing the relation between a pressure within the intake pipe and an engine fuel efficiency rate. Referring to FIG. 4, the axis of abscissas represents the pressure within the intake pipe. The lower the pressure within the intake pipe is, the higher the negative pressure in intake pipe 53 is. The axis of ordinates represents the engine fuel efficiency rate (g/kWh). The lower the engine fuel efficiency rate is, the better the fuel efficiency is.

A pressure P1 indicates a lower limit of the negative pressure required to cause the evaporated fuel to flow into intake pipe 53 by the purge mechanism. In order to implement the purge control, it is necessary to reduce the pressure within the intake pipe to be lower than P1. However, if the pressure within the intake pipe is reduced (if the negative pressure is increased), the engine fuel efficiency rate is increased (the fuel efficiency is deteriorated).

A pressure P2 indicates a negative pressure point where optimum fuel efficiency is realized. Namely, if the opening degree of throttle 54 is increased to reduce the negative pressure in intake pipe 53 (the pressure within the intake pipe is increased), the pumping loss is decreased, and thus the engine fuel efficiency rate is decreased (the fuel efficiency is improved). However, if the opening degree of throttle 54 is too large, an amount of air is increased too much and may cause knocking. Accordingly, there is a negative pressure point optimizing the fuel efficiency where the negative pressure is low (the pressure within the intake pipe is high) to an extent not to cause knocking.

Hence, in the present embodiment, if the purge control is not implemented, the upper limit value of the opening degree of throttle 54 is set to the maximum opening degree, and the opening degree of throttle 54 is controlled to a fuel efficiency-optimizing opening degree realizing the fuel efficiency-optimizing negative pressure point.

Figure 5:
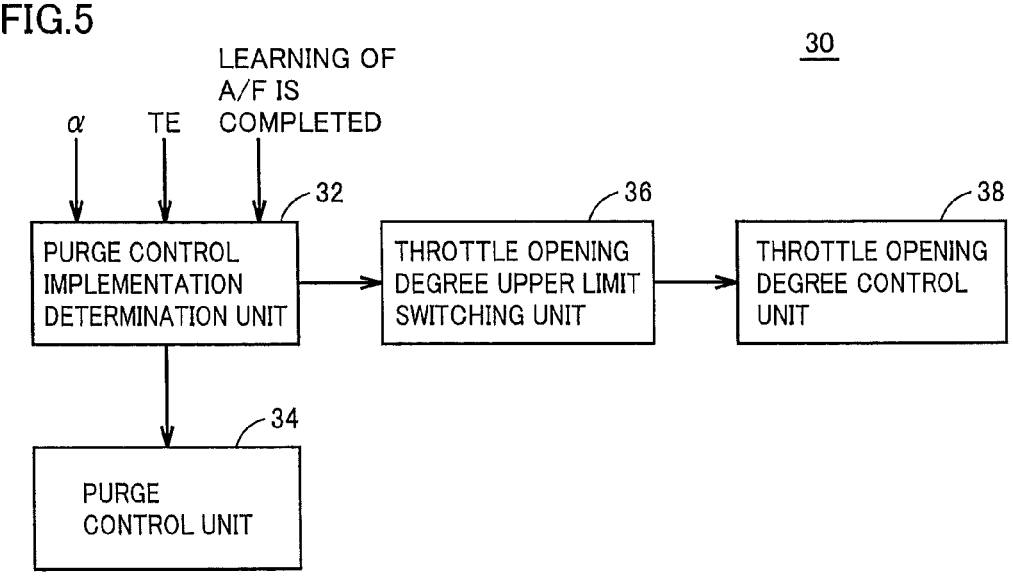
FIG. 5 is a functional block diagram of a portion of an ECU for purge control and setting of an opening degree of a throttle.

FIG. 5 is a functional block diagram of a portion of ECU 30 for the purge control and setting of the opening degree of throttle 54. Referring to FIG. 5, ECU 30 includes a purge control implementation determination unit 32, a purge control unit 34, a throttle opening degree upper limit switching unit 36, and a throttle opening degree control unit 38.

Purge control implementation determination unit 32 determines whether or not to implement the purge control which causes the evaporated fuel to flow into intake pipe 53 by the purge mechanism in accordance with the predetermined implementation conditions. As an example, in a case where a purge concentration (concentration of the evaporated fuel) detected by a concentration sensor not shown is higher than a predetermined value α, if a cooling water temperature TE of engine 2 is not less than a constant value and learning of an A/F (air-fuel ratio) is completed, purge control implementation determination unit 32 determines to implement the purge control.

If it is determined by purge control implementation determination unit 32 to implement the purge control, purge control unit 34 actually implements the purge control by the purge mechanism. Specifically, purge control unit 34 generates a control signal for placing purge control valve 64 in an open state, and outputs the generated control signal to purge control valve 64.

Throttle opening degree upper limit switching unit 36 switches the upper limit value of the opening degree of throttle 54 based on a determination result of purge control implementation determination unit 32. Namely, if it is determined by purge control implementation determination unit 32 to implement the purge control, throttle opening degree upper limit switching unit 36 sets the upper limit value of the opening degree of throttle 54 to the limited opening degree which can secure the negative pressure required to cause the evaporated fuel to flow into intake pipe 53 by the purge mechanism. The limited opening degree varies depending on a rotation speed of engine 2, an air filling rate, and the like, and is determined using a map or the like having the rotation speed of engine 2, the air filling rate, and the like as parameters. On the other hand, if it is determined by purge control implementation determination unit 32 not to implement the purge control, throttle opening degree upper limit switching unit 36 sets the upper limit value of the opening degree of throttle 54 to the maximum opening degree (for example, the mechanical maximum opening degree) of throttle 54.

Throttle opening degree control unit 38 sets the fuel efficiency-optimizing opening degree for optimizing the fuel efficiency of engine 2. As an example, the fuel efficiency-optimizing opening degree is set to an opening degree large enough to reduce pumping loss and not to cause knocking. If the fuel efficiency-optimizing opening degree is smaller than the upper limit value set by throttle opening degree upper limit switching unit 36, throttle opening degree control unit 38 controls the opening degree of throttle 54 to the fuel efficiency-optimizing opening degree. On the other hand, if the fuel efficiency-optimizing opening degree is not less than the upper limit value set by throttle opening degree upper limit switching unit 36, throttle opening degree control unit 38 controls the opening degree of throttle 54 to the upper limit value.

It is noted that, if it is determined by purge control implementation determination unit 32 not to implement the purge control, the upper limit value of the opening degree of throttle 54 does not function by being set to the maximum opening degree of throttle 54, and thus the opening degree of throttle 54 is controlled to the fuel efficiency-optimizing opening degree.

Figure 6:
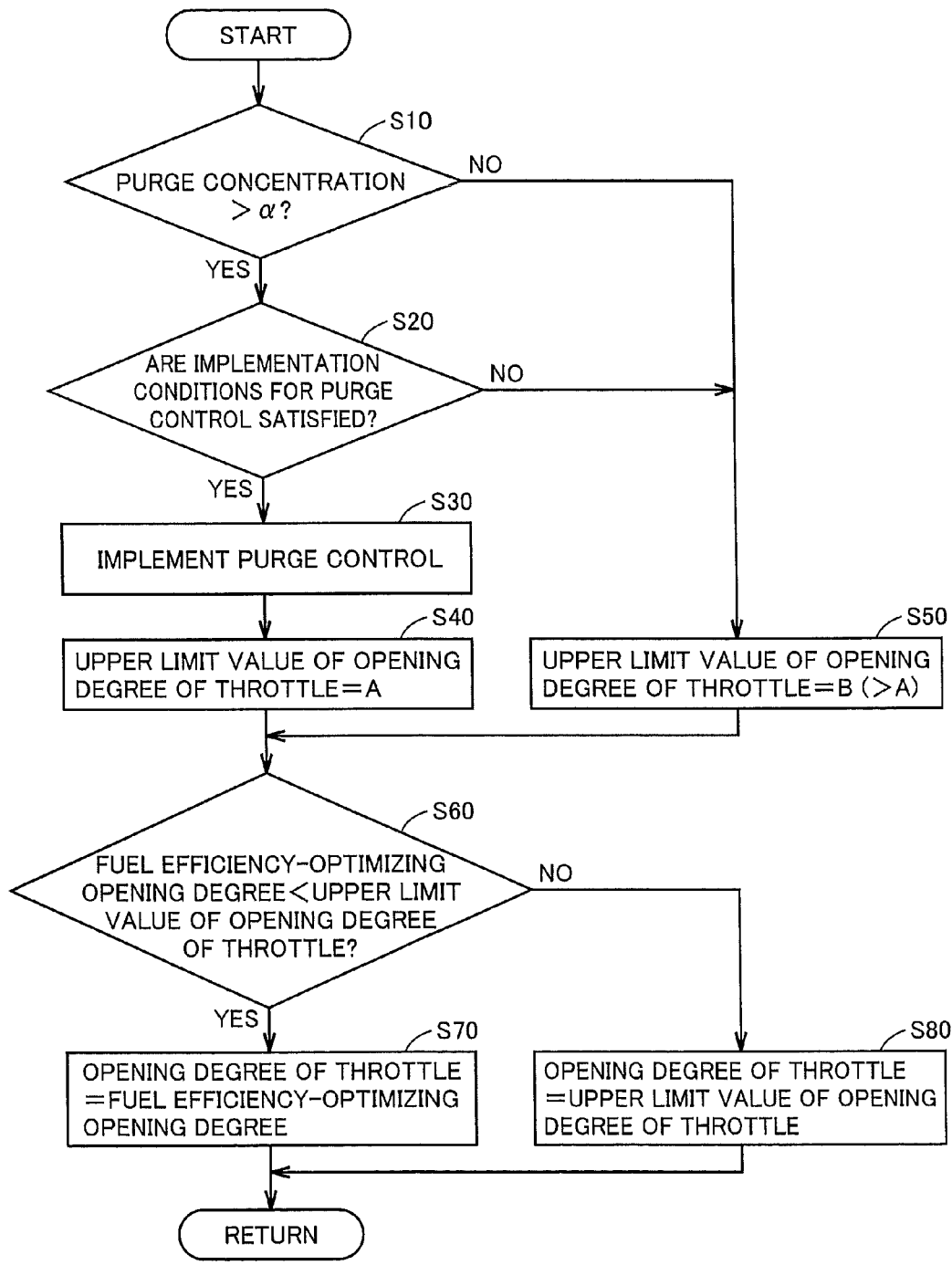
FIG. 6 is a flowchart for illustrating a procedure of processing for the purge control and the setting of the opening degree of the throttle.

FIG. 6 is a flowchart for illustrating a procedure of processing for the purge control and the setting of the opening degree of throttle 54. It is noted that the processing shown in the flowchart is invoked from a main routine and performed at regular time intervals or whenever predetermined conditions are satisfied.

Referring to FIG. 6, ECU 30 determines whether or not the purge concentration (concentration of the evaporated fuel) detected by the concentration sensor not shown is higher than predetermined value α (step S10). If ECU 30 determines that the purge concentration is higher than α (YES in step S10), ECU 30 determines whether or not the predetermined implementation conditions for the purge control are satisfied (step S20). As an example, if the cooling water temperature of engine 2 is not less than a constant value and learning of the A/F (air-fuel ratio) is completed, ECU 30 determines that the implementation conditions for the purge control are satisfied.

If ECU 30 determines that the implementation conditions for the purge control are satisfied (YES in step S20), ECU 30 outputs an instruction for opening to purge control valve 64 (FIG. 2) to implement the purge control (step S30), and sets the upper limit value of the opening degree of throttle 54 to a predetermined value A (step S40). This value A corresponds to the limited opening degree which can secure the negative pressure required to cause the evaporated fuel to flow into intake pipe 53 by the purge mechanism.

On the other hand, if ECU 30 determines in step S10 that the purge concentration is not more than α (NO in step S10), or if ECU 30 determines in step S20 that the implementation conditions for the purge control are not satisfied (NO in step S20), ECU 30 sets the upper limit value of the opening degree of throttle 54 to a predetermined value B (step S50). This value B corresponds to the maximum opening degree (for example, the mechanical maximum opening degree) of throttle 54, and is larger than value A.

Next, ECU 30 determines the fuel efficiency-optimizing opening degree for optimizing the fuel efficiency of engine 2, and determines whether or not the fuel efficiency-optimizing opening degree is smaller than the upper limit value of the opening degree of throttle 54 set in step S40 or S50 (step S60). As an example, the fuel efficiency-optimizing opening degree is set to an opening degree large enough to reduce pumping loss and not to cause knocking.

Then, if ECU 30 determines that the fuel efficiency-optimizing opening degree is smaller than the upper limit value of the opening degree of throttle 54 (YES in step S60), ECU 30 sets the opening degree of throttle 54 to the fuel efficiency-optimizing opening degree (step S70). On the other hand, if ECU 30 determines that the fuel efficiency-optimizing opening degree is not less than the upper limit value of the opening degree of throttle 54 (NO in step S60), ECU 30 sets the opening degree of throttle 54 to the upper limit value of the opening degree of throttle 54 set in step S40 or S50 (step S80).

It is noted that, if it is determined in step S20 that the implementation conditions for the purge control are not satisfied, the upper limit value of the opening degree of throttle 54 is set to value B, that is, the maximum opening degree, in step S50, and thus the opening degree of throttle 54 is controlled to the fuel efficiency-optimizing opening degree.

As described above, in the present embodiment, the upper limit value of the opening degree of throttle 54 is switched based on whether or not to implement the purge control. Namely, if the purge control is implemented, the upper limit value is set to the limited opening degree which can secure the negative pressure required to cause the evaporated fuel to flow into intake pipe 53, and if the purge control is not implemented, the upper limit value is set to the maximum opening degree of throttle 54. Thereby, pumping loss can be reduced without disturbing implementation of the purge control. Therefore, according to the present embodiment, deterioration of evaporative emission can be prevented, and deterioration of fuel efficiency can also be prevented.

Although the above embodiment has described a series/parallel type hybrid vehicle in which motive power of engine 2 can be split by power split device 4 and transmitted to drive shaft 12 and motor generator 6, the present invention is also applicable to other types of hybrid vehicles. Namely, the present invention is also applicable to, for example, a so-called series type hybrid vehicle in which engine 2 is used only for driving motor generator 6 and a drive force for the vehicle is generated only by motor generator 10, a hybrid vehicle in which only regenerative energy among kinetic energy generated by engine 2 is recovered as electrical energy, a motor-assist type hybrid vehicle mainly powered by an engine and assisted by a motor as necessary, and the like.

Further, the present invention is not limited to a hybrid vehicle, and is also applicable to a conventional type vehicle including only an engine as a motive power source. It is noted that, in a hybrid vehicle in which an engine is operated at an operation point having the highest fuel efficiency rate, the operation point is a low negative pressure point (region with high torque and low rotation), and thus the invention of the present application, which reduces pumping loss by increasing the upper limit value of the opening degree of the throttle when the purge control is not implemented, can be said as suitable for a hybrid vehicle.

It is noted that, in the above description, engine 2 corresponds to one practical example of an "internal combustion engine" in the present invention, and release flow channel 61, canister 62, purge flow channel 63, and purge control valve 64 form one practical example of a "purge mechanism" in the present invention. Further, purge control implementation determination unit 32 corresponds to one practical example of a "determination unit" in the present invention, and throttle opening degree upper limit switching unit 36 corresponds to one practical example of a "switching unit" in the present invention.

It should be understood that the embodiment disclosed herein is illustrative and non-restrictive in every respect. The scope of the present invention is defined by the scope of the claims, rather than the description of the embodiment described above, and is intended to include any modifications within the scope and meaning equivalent to the scope of the claims.

Reference Signs List

2: engine; 4: power split device; 6, 10: motor generator; 8: reduction mechanism; 12: drive shaft; 14: wheel; 16: power storage device; 18, 20: power converter; 30: ECU; 32: purge control implementation determination unit; 34: purge control unit; 36: throttle opening degree upper limit switching unit; 38: throttle opening degree control unit; 52: intake port; 53: intake pipe; 54: throttle; 56: throttle opening degree sensor; 57: air flow meter; 58: air cleaner; 59: injector; 60: fuel tank; 61: release flow channel; 62: canister; 63: purge flow channel; 64: purge control valve; 100: hybrid vehicle.

The invention claimed is:

1. A control device for an internal combustion engine, said internal combustion engine including a purge mechanism for implementing purge control which causes evaporated fuel generated within a fuel tank to flow into an intake pipe, utilizing a negative pressure within said intake pipe which varies in accordance with an opening degree of a throttle provided in said intake pipe, said control device for the internal combustion engine comprising:
    a determination unit determining whether or not to implement said purge control in accordance with predetermined implementation conditions;
    a switching unit switching an upper limit value of the opening degree of said throttle based on a determination result of said determination unit, wherein,
    when it is determined by said determination unit to implement said purge control, said switching unit sets said upper limit value to a first value, and when it is determined by said determination unit not to implement said purge control, said switching unit sets said upper limit value to a second value larger than the first value; and
    a throttle opening degree control unit controlling the opening degree of said throttle to a fuel efficiency-optimizing opening degree for optimizing fuel efficiency of said internal combustion engine, when it is determined by said determination unit not to implement said purge control.

2. The control device for the internal combustion engine according to claim 1, wherein
    said first value is a limited opening degree of said throttle which can secure a negative pressure
    required to cause said evaporated fuel to flow into said intake pipe by said purge mechanism, and said second value is a maximum opening degree of said throttle.

3. A hybrid vehicle including a control device for an internal combustion engine, said internal combustion engine including a purge mechanism for implementing purge control which causes evaporated fuel generated within a fuel tank to flow into an intake pipe, utilizing a negative pressure within said intake pipe which varies in accordance with an opening degree of a throttle provided in said intake pipe, said control device for the internal combustion engine comprising:
    a determination unit determining whether or not to implement said purge control in accordance with predetermined implementation conditions;
    a switching unit switching an upper limit value of the opening degree of said throttle based on a determination result of said determination unit, wherein,
    when it is determined by said determination unit to implement said purge control, said switching unit sets said upper limit value to a first value, and when it is determined by said determination unit not to implement said purge control, said switching unit sets said upper limit value to a second value larger than the first value; and
    a throttle opening degree control unit controlling the opening degree of said throttle to a fuel efficiency-optimizing opening degree for optimizing fuel efficiency of said internal combustion engine, when it is determined by said determination unit not to implement said purge control.

4. A method for controlling an internal combustion engine using a processor and an opening degree of a throttle actuator, said internal combustion engine including a purge mechanism for implementing purge control which causes evaporated fuel generated within a fuel tank to flow into an intake pipe, utilizing a negative pressure within said intake pipe which varies in accordance with the opening degree of the throttle provided in said intake pipe, said method for controlling the internal combustion engine comprising the steps of:
    determining whether or not to implement said purge control in accordance with predetermined implementation condition with the processor;

switching an upper limit value of the opening degree of said throttle based on a determination result as to whether or not to implement said purge control with the processor,
   the step of switching said upper limit value including the steps of
      setting said upper limit value to a first value when it is determined to implement said purge control with the processor, and
      setting said upper limit value to a second value larger than the first value when it is determined not to implement said purge control with the processor; and
controlling, with the processor, the opening degree of said throttle to a fuel efficiency-optimizing opening degree for optimizing fuel efficiency of said internal combustion engine, when it is determined not to implement said purge control.

5. The method for controlling the internal combustion engine according to claim 4, wherein
   said first value is a limited opening degree of said throttle which can secure a negative pressure required to cause said evaporated fuel to flow into said intake pipe by said purge mechanism, and
   said second value is a maximum opening degree of said throttle.

\* \* \* \* \*